United States Patent [19]
Perry

[11] Patent Number: 6,047,063
[45] Date of Patent: Apr. 4, 2000

[54] METHODS AND APPARATUS FOR PROVIDING AN AUXILIARY COMMUNICATION LINE

[75] Inventor: Steven B. Perry, Perrineville, N.J.

[73] Assignee: ANTEC Corporation, Duluth, Ga.

[21] Appl. No.: 08/590,187

[22] Filed: Jan. 23, 1996

[51] Int. Cl.[7] .................................................. H04M 17/00
[52] U.S. Cl. .......................... 379/399; 379/147; 379/279; 379/323; 379/413
[58] Field of Search ...................................... 379/399, 398, 379/29, 27, 1, 379, 56.2, 2, 37, 413, 93.14, 334, 336, 338, 341, 279; 370/359, 351, 357, 216, 217, 220; 340/310.02, 286.01, 827; 359/109, 171; 327/403; 395/181, 182.01, 182.02

[56] References Cited

U.S. PATENT DOCUMENTS

| | | | |
|---|---|---|---|
| Re. 32,856 | 2/1989 | Milsap et al. ............................ | 340/539 |
| 3,633,166 | 1/1972 | Picard ..................................... | 370/452 |
| 3,886,318 | 5/1975 | Charransol et al. .................... | 370/228 |
| 3,904,829 | 9/1975 | Martin et al. ............................ | 370/424 |
| 4,009,469 | 2/1977 | Boudreau et al. ...................... | 370/223 |
| 4,853,957 | 8/1989 | Seeger et al. ............................ | 379/279 |
| 4,926,458 | 5/1990 | Reger et al. .............................. | 379/27 |
| 4,972,465 | 11/1990 | Cline et al. .............................. | 379/279 |
| 5,365,510 | 11/1994 | Nicholson et al. ...................... | 370/222 |
| 5,410,590 | 4/1995 | Blood et al. ............................. | 379/147 |
| 5,509,065 | 4/1996 | Fitzgerald ............................... | 379/279 |
| 5,617,466 | 4/1997 | Walance .................................. | 379/28 |

Primary Examiner—Vivian Chang
Assistant Examiner—Jacques M. Saint-Surin

[57] ABSTRACT

Methods and apparatus for using and/or switching to an auxiliary communication pathway to increase system reliability and/or reduce maintenance costs is disclosed. One feature is directed to a smart network interface device (SNID) implemented using latching relays. The SNID has very low power requirements and can be remotely controlled in a reliable manner through the use of simple tone signal commands over common POTS line pairs. Upon detecting a fault condition on a main line pair, the SNID is remotely instructed to disconnect the faulty line pair and switch the telephone customer's line connected to the faulty line pair to an auxiliary line pair. To operate in a POTS telephone environment without the need for an additional power supply, the SNID is designed to be powered from the power available from the auxiliary line pair. The power supply circuitry of the SNID is designed to have a near infinite input impedance with regard to input signals below twenty volts. Tone signals which are readily generated by equipment commonly found within the telephone network are used as control signals to reduce the cost associated with providing a command transmitter. Control signals of relatively long durations, e.g., in excess of 0.1 second, are used to reduce the accuracy required of the tone generation and detection equipment needed and to reduce the chance of erroneous command signals.

17 Claims, 10 Drawing Sheets

6,047,063

METHODS AND APPARATUS FOR PROVIDING AN AUXILIARY COMMUNICATION LINE

FIELD OF THE INVENTION

The present invention is directed to communication systems, and more particularly, to methods and apparatus for using and/or switching to an auxiliary communication pathway to increase system reliability and/or reduce maintenance costs.

BACKGROUND OF THE INVENTION

The use of communications networks, e.g., telephone systems, is becoming increasingly important as many businesses and individuals rely on these communications networks for both business and personal matters. With the increased use of communications networks it is also becoming increasingly important that such communication systems be provided in a reliable and cost effective manner.

At the present time, telephone companies and network providers are continuing to upgrade services by, e.g., installing fiber optic lines between central offices and more recently, between end offices and subscriber loop carrier systems. A subscriber loop carrier system allows the central office telephone line interface to be extended great distances from the central office using a high speed digital pathway, typically a fiber optic link. Optical network units (ONU) are used to couple the fiber optic lines in said subscriber loop carrier systems to conventional twisted copper telephone lines which, in most cases, complete the link to the end user of the communication service. Such conventional telephone lines are frequently referred to as drop pairs because they comprise a pair of wires dropping to the customer at the last portion of the telephone system link. Because of the cost and complexity of fiber optic communications equipment, it is likely that copper wire, e.g., twisted pair, will continue to be the primary choice for providing service to end users at the last portion of the telephone system loop for many years to come. Such systems are sometimes referred to in the communication industry as plain old telephone service (POTS). It is also important to note that POTS service will continue to be delivered to the subscriber over copper pairs directly from the central office as well as from subscriber loop carrier systems without the use of fiber optics.

Unfortunately, the use of copper wire as a communication pathway has several disadvantages. First, copper lines are subject to interference and other fault conditions, such as opens and shorts, which can interrupt communications. Second, such transmission lines have limited bandwidth capacity and are usually only capable of serving as a single communication channel. Accordingly, in order to resolve fault conditions or add additional channel capacity or capabilities to an end user in such a system, it is generally necessary to replace an existing faulty line or add an additional line.

Such service is normally performed by sending a technician to the user's facilities to add a new line or replace an existing line. Such field service calls are costly because they occur at unpredictable times and require a technician to spend valuable time traveling to a user's facilities.

Accordingly, there is a need for methods and apparatus that will reduce service technician travel time, permit the scheduling of service in a predictable manner to make more efficient use of available service resources and to reduce peak service demands. At the same time the telephone service providers are trying to provide improved customer service response time in an increasingly competitive marketplace. To achieve such goals, it is desirable that a telephone company or other service provider be capable of substituting a functional line for a faulty one and/or adding an additional line to provide increased service to a user without having to send a technician to the user's residence or facilities.

While various digital communications systems such as those described in U.S. Pat. Nos. 5,365,510, 4,009,469 and 3,886,318 describe the use of an auxiliary communication pathway in the digital systems described therein, such systems are not well suited for use with POTS systems, frequently used as the communications channels to end users of telephone service, for several reasons.

First, such known digital systems are not designed to be powered from the limited current available from a POTS line. Second, the commands used to control switching in the known systems are digital signals which are relatively short complex signals which may be susceptible to interference present on POTS lines and furthermore, such digital signaling is typically not supported over common analog telephone circuits. In addition, because of the circuit complexity associated with the generation, detection, and decoding of the relatively short digital command signals used in the known systems, the known systems are more complex than is desirable for the implementation of an inexpensive telephone smart network interface device ("SNID").

Accordingly, there is a need for a method and apparatus that can be used to remotely provide a substitute communication line for a faulty line and/or can be used to provide an additional communication line to a user.

It is also highly desirable that such a SNID be capable of being powered from a standard POTS line, thereby avoiding the need for a separate power source and that it be simple and inexpensive to build.

In addition to the above features, the SNID should be responsive to command signals which can be readily generated by existing telephone tone signal generating equipment. Furthermore, the command signals used should be of a type which are not easily interfered with by power surges or other noise commonly found on POTS telephone lines.

Following the expectations of quality service in the communications systems as they exist today, the SNID should be transparent to various telephone system architectures, operations and various types of telephone termination equipment. It should have minimal impact on system reliability.

For cost reasons, it is also desirable that such switching apparatus be simple to implement and easy to install.

SUMMARY OF THE PRESENT INVENTION

The present invention is directed to communications systems, and more particularly, to methods and apparatus for using, and/or switching to, an auxiliary communication pathway to increase system reliability, reduce maintenance costs, and/or improve customer service.

One feature of the present invention is directed to a network interface device which can be remotely controlled through the use of simple tone signal commands. Because the network interface device of the present invention is responsive to remote commands, it may be referred to as a smart network interface device or ("SNID").

The SNID of the present invention includes a plurality of main pair line inputs, a plurality of main pair line outputs and an auxiliary line pair input. In telephone terminology, the main pair line inputs are sometimes referred to as primary line inputs. A relay matrix which includes latching relays is used to couple the line pair inputs and outputs together. In the event of a fault condition on one of the main line pairs which are coupled to the input of the SNID of the present invention, a tone signal can be sent from a remote location, e.g., a central telephone office, which will cause the auxiliary line pair input of the SNID of the present invention to be coupled to the line pair output of the SNID corresponding to the faulty main line pair. As part of the switching operation, the faulty main line pair is disconnected by the switching of a relay so that it will not impair communication over the auxiliary line.

By adding the ability to remotely control the substitution of an auxiliary line pair for one of a plurality of faulty main line pairs or provide a temporary new service line over the auxiliary line pair, the need for an immediate service call can, in many cases, be avoided. This permits service calls in a given area to be scheduled, thereby reducing technician travel time and the telephone company's maintenance costs.

To avoid the need to provide the SNID of the present invention with a separate power source, the SNID of the present invention is designed to consume very little power and operate off the power available from the auxiliary line pair while not affecting telephone service. The use of latching relays insures that the relay matrix included in the SNID only requires power when a relay switching operation is performed. In this manner, the relay matrix does not drain power from the auxiliary line when the auxiliary line pair is being used for voice or data communications and will not unintentionally switch when power is lost.

In addition to the use of latching relays to limit power requirements, the internal power supply of the SNID of the present invention is designed so that it has a very high input impedance below a preselected, e.g., 20 volt input level. The power supply is designed in this manner so that it does not load the auxiliary line pair during off hook conditions and interfere with communications thereon. Other advantages of this approach include being transparent to test equipment commonly used to detect line faults. The SNID should not be detectable by test equipment in order to preserve the accuracy of the test system.

In accordance with the present invention, the control signals used to control the switching of the latching relays are tones which are capable of being generated by standard POTS tone generators e.g., signals with a frequency typically below 3 Khz. In one embodiment, command signals, e.g., tones, of a single frequency are used to control the switching and resetting of the relays in the relay matrix.

In addition to using tones which are readily available in a POTS system, command signals with relatively long duration's are used in some embodiments to reduce the chance of erroneous switching and to make them easy to detect using relatively simple and inexpensive circuitry.

Because the SNID of the present invention can be implemented using relatively few components which are powered from the line pairs coupled to the SNID, the SNID can be sealed in a relatively small weather resistant housing capable of being easily mounted in a variety of field locations.

By providing a SNID which supports line pairs in excess of the number initially used by an end user, additional service can be provided to the user without the need for service calls by simply using the spare line pair that was connected at the time the SNID was initially installed.

Numerous other embodiments and features of the present invention are discussed below.

DETAILED DESCRIPTION

As discussed above, the present invention is directed to methods and apparatus for providing, using, and/or switching to an auxiliary communication pathway to increase the reliability of a communication system and/or reduce maintenance costs.

Figure 1:
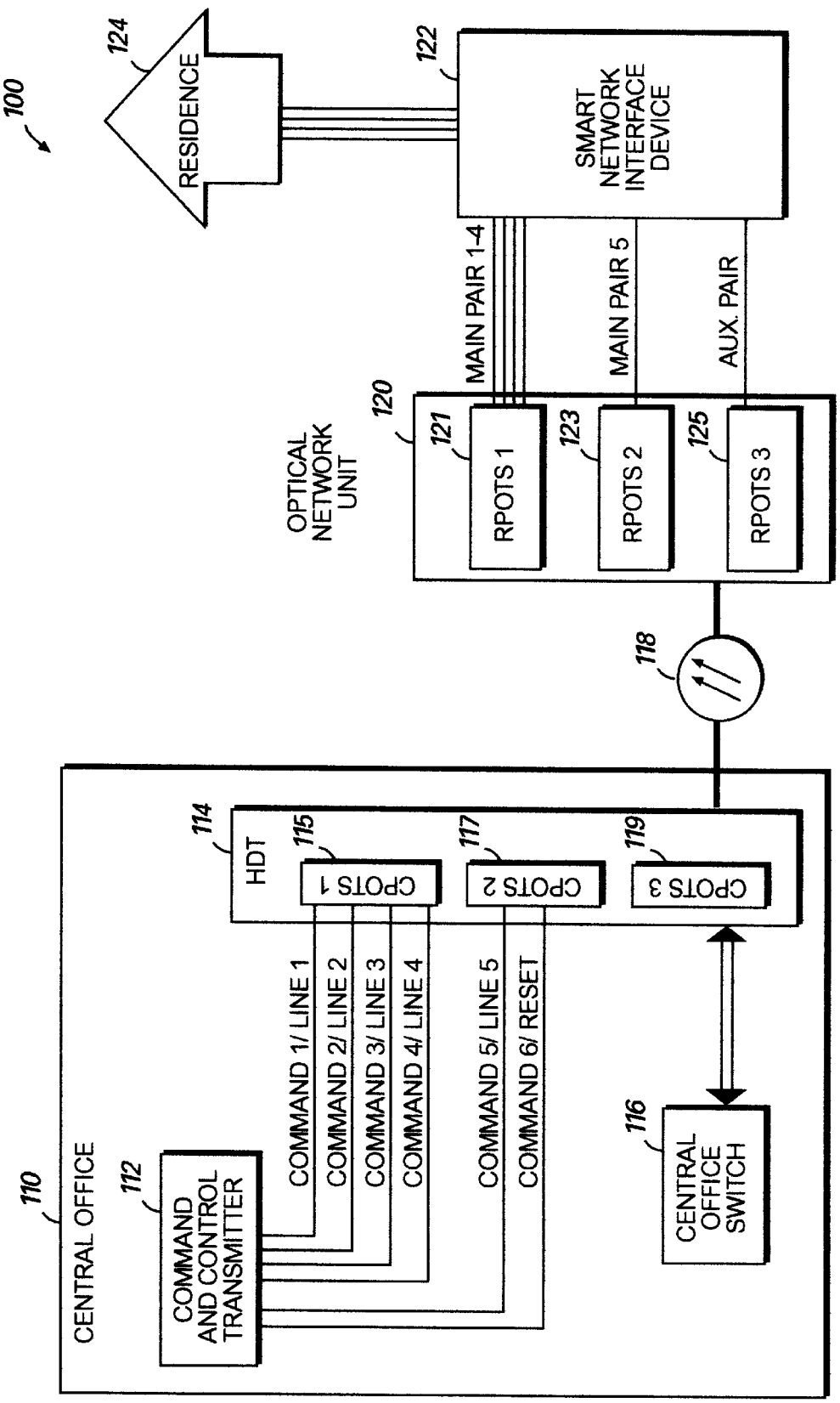
FIG. 1 is a block diagram of a communication system incorporating a smart network interface device (SNID) according to one embodiment of the present invention.

Referring now to FIG. 1, there is illustrated a communication system 100, e.g., a telephone system, implemented in accordance with one exemplary embodiment of the present invention. The telephone system 100 comprises a central office 110, a fiber optic line 118, an optical network unit 120, a smart network interface device 122 and an end user of the communication service represented by the residence 124.

The central office 110 receives, processes, and routes communication signals received from a plurality of sources including, e.g., local telephone offices and various end users. The central office 110 includes a command and control transmitter 112, a host digital terminal 114 and a central office switch 116. The host digital terminal comprises a plurality of CPOTS ("central office POTS") line cards 115, 117, 119 which are used to couple command and communication lines, e.g., voice communication lines, to the fiber optic line 118.

The central office switch 116 is responsible for routing communication signals received from, e.g., a plurality of POTS voice communications lines, to the appropriate end user via the host digital terminal 114. In the embodiment of FIG. 1, the central office switch is coupled to a CPOTS line card 119 in the host digital terminal 114 by a plurality of communication lines. Typically, there are many CPOTS line cards at this interface point.

As will be discussed in further detail below, the command and control transmitter 112 is responsible for the generation of one or more tone signals which are used, in accordance with the present invention, to control the setting of relays in the SNID 122. Commands to substitute an auxiliary line pair for a main line pair and to reset the relays included in the SNID 122 are supported. In the embodiment of FIG. 1, a separate line is used to supply each of the possible commands to one of the CPOTS line cards 115, 117 of the host digital terminal (HDT) 114 for routing to the SNID 122.

While the illustrated embodiment of FIG. 1 includes a command and control transmitter 112 that is distinct from the host digital terminal 114, it is to be understood that it can be readily incorporated into the host digital terminal 114 or other system equipment commonly found within the central office. The use of tones which can be generated by standard host digital terminal circuitry for command signals facilitates the incorporation of the command and control transmitter into the host digital terminal 114.

The host digital terminal 114 is coupled by the fiber optic line 118 to the optical network unit (ONU) 120. The optical network line 118 comprises one or more optic fibers capable of serving as a plurality of communication channels.

The optical network unit 120 comprises a plurality of remote POTS (RPOTS) line cards 121, 123, 125. The RPOTS line cards 121, 123, 125 couple the ONU 120 to the SNID 122 via a plurality of communication lines. In the embodiment of FIG. 1, five main line pairs and one auxiliary line pair are used to couple the RPOTS 121, 123, 125 to the SNID 122. In the illustrated embodiment each of the main and auxiliary line pairs comprise a pair of wires, e.g., twisted copper wires, suitable for use as an analog voice communications channel.

To increase system reliability and reduce the risk that a failure on one RPOTS card 121, 123, 125 will interrupt all data communication services, the main and auxiliary communication line pairs are coupled to different RPOTS line cards 121, 123, and 125 located within the optical network unit 120.

It should be noted that while a single SNID 122 is shown as being coupled to the optical network unit 121, a large number of SNIDs 122 may be coupled to the optical network unit 120 with one or more SNIDs servicing each end user. Ultimately, the number of lines which can be provided is determined by the capacity of the optical network unit 120 to hold RPOTS cards.

The SNID 122 couples the line pairs from the optical network unit 120 to the end user 124. The SNID 122 is responsive to commands generated by the command and control transmitter 112 to disconnect any one of the main communication lines from the optical network unit 120 and couple the auxiliary communication line from the optical network unit 120 to the end user 124 in its place.

Figure 2:
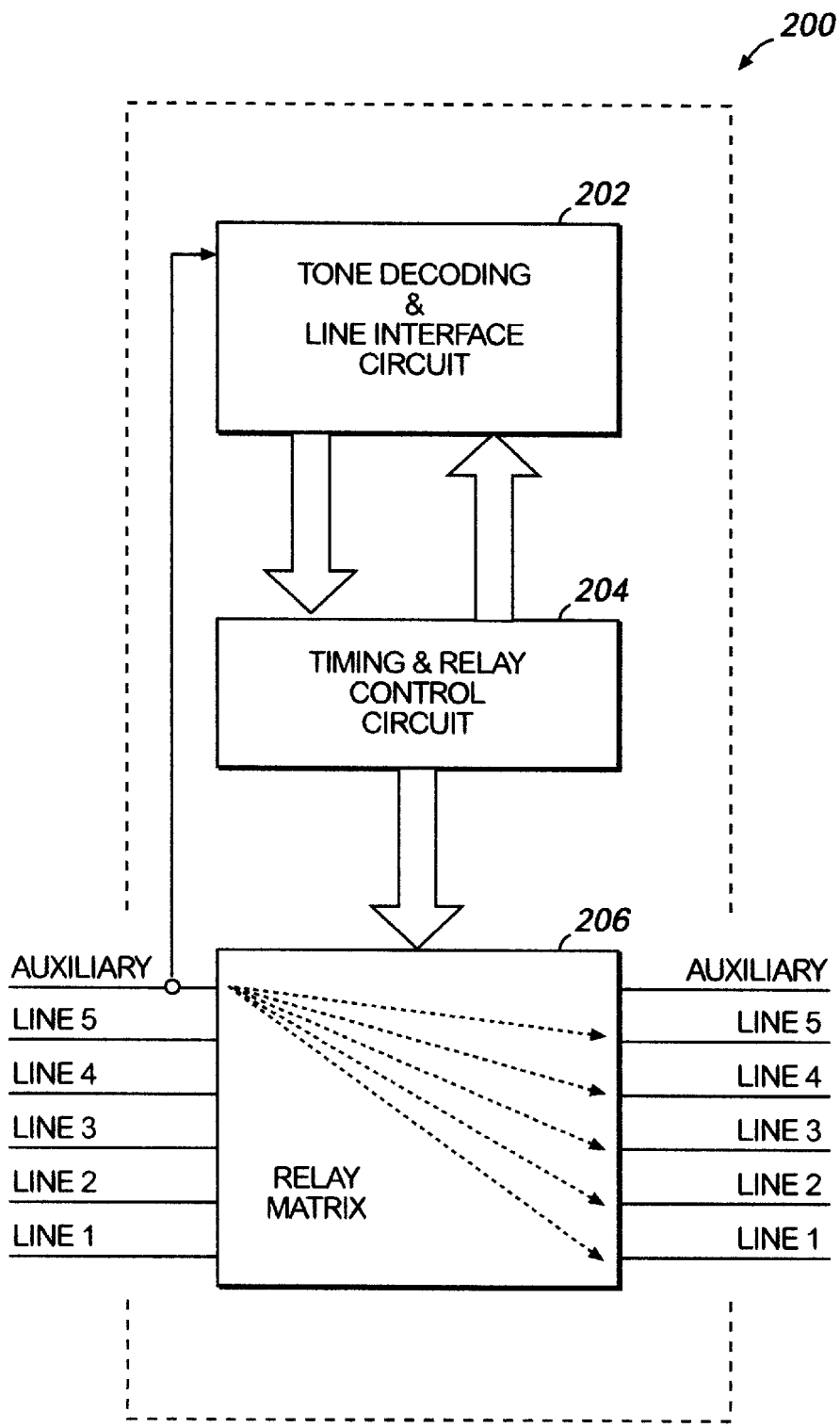
FIG. 2 is a block diagram representation of a SNID according to the present invention which may be used as the SNID of FIG. 1.

Referring now to FIG. 2, there is illustrated a block diagram representation of a SNID 200 according to one embodiment of the present invention. The SNID 200 may be used as the SNID 122 of FIG. 1. As illustrated, the SNID 200 comprises a tone decoding and line interface (TDLI) circuit 202, a timing and relay control (TRC) circuit 204 and a relay matrix 206.

An auxiliary line pair input of the SNID 200 is coupled to a control signal input of the TDLI circuit 202 and to an auxiliary line pair input of the relay matrix 206. Inputs for five main line pairs, i.e., line 1 through line 5, are coupled to corresponding inputs of the relay matrix 206. During normal operation, the relay matrix 206 is configured so that each of the five line pair inputs to the relay matrix are coupled to a corresponding one of the relay matrix's five line pair outputs.

However, in the event that a service affecting line condition is detected on any one of the five main line pairs, the relay matrix 206 can be selectively connected from the central office 110, via commands transmitted to the SNID 200 over the auxiliary input line. The commands may instruct the SNID 200 to disconnect the faulty or noisy main line pair and to connect the auxiliary line pair to the corresponding main line pair's output to substitute for the disconnected main line pair. The dotted lines in the relay matrix 206 represent the controlled connecting of the auxiliary input line pair to one of the five line pair outputs. For simplicity, the diagram of the relay matrix 206 does not illustrate the ability of the switches within relay matrix 206 to disconnect the faulty main pair when substituted by the auxiliary pair.

The TDLI circuit 202 receives commands via the auxiliary line pair. The TDLI circuit is coupled to the TRC circuit 204. The TDLI and TRC circuits 202, 204 operate together to detect switch set and reset commands. The TRC circuit 204 is coupled to the relay matrix 206 and is responsible for generating the control signals which cause relays in the relay matrix to set or reset.

Figure 3:
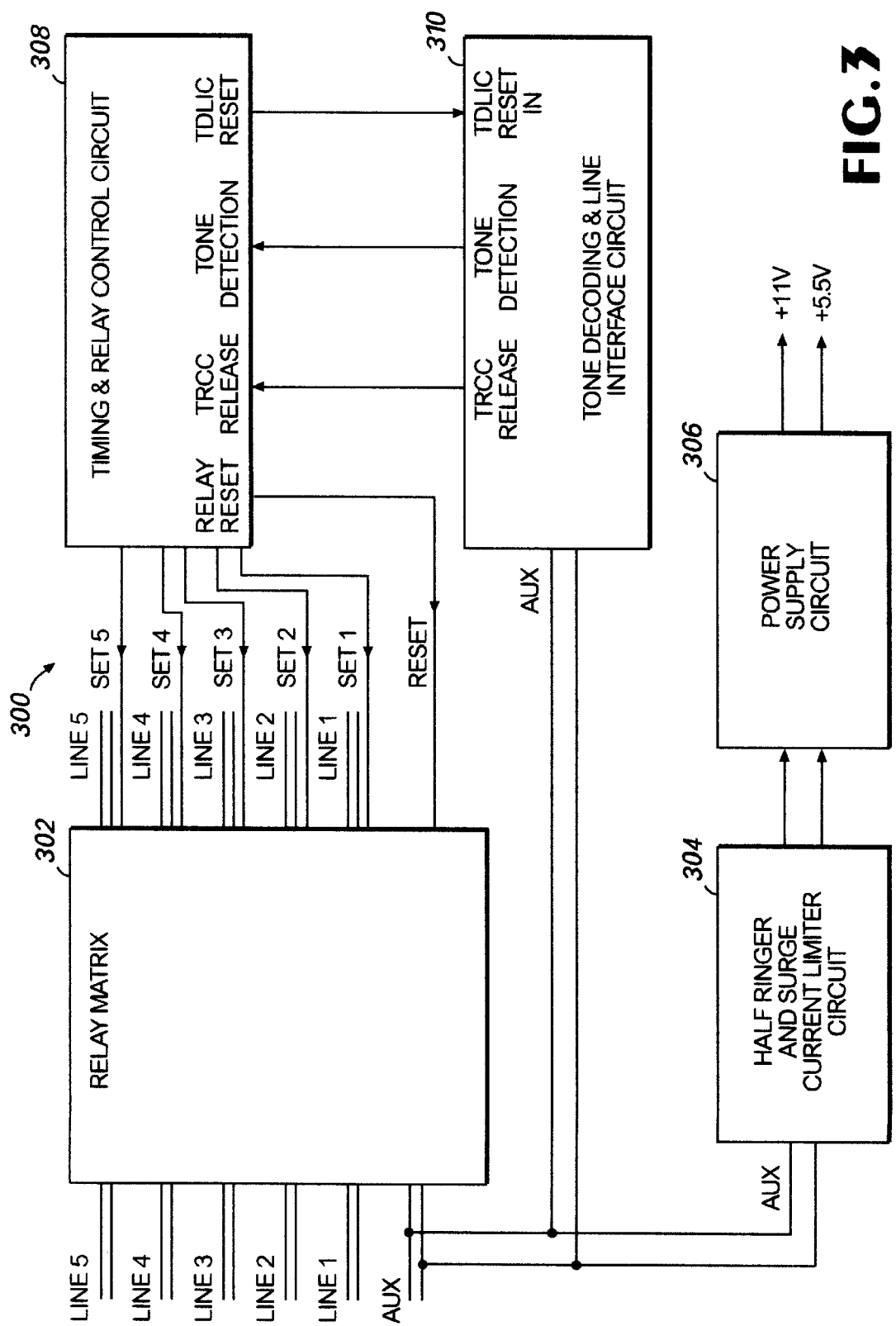
FIG. 3 is a more detailed block diagram of a SNID according to an exemplary embodiment of the present invention.

Referring now to FIG. 3, there is illustrated a more detailed block diagram of a SNID 300 according to an exemplary embodiment of the present invention. As illustrated the SNID 300 comprises a relay matrix 302, a TRC circuit 308 and a TDLI circuit 310 coupled together. Elements of the SNID 300 of FIG. 3 which are the same as, or similar to, the circuits of FIG. 2 bear the same names. As illustrated, in the embodiment of FIG. 3, each of the line pairs comprises a pair of wires.

In addition to the relay matrix 302, TRC circuit 308 and TDLI circuit 310, the SNID 300 further comprises a half ringer and surge current limiter circuit 304 and a power supply circuit 306. An input to the half ringer and surge current limiter circuit 304 is coupled to the auxiliary line pair. As is known in the art, the use of a half ringer circuit permits the testing of circuit continuity from a remote location, e.g., the central office 110 up to the point where the half ringer circuit is located.

In accordance with the present invention, the half ringer circuit is partially coupled in series with the power supply circuit 306. In this embodiment, the resistance of the half ringer circuit serves as a current limiter to protect the power supply from otherwise potentially harmful power surges due to, e.g., lightning induced noise spikes, on the auxiliary line pair.

The power supply 306 uses the auxiliary line pair as its sole power source. From a DC signal of approximately 48 volts received from the optical network unit 120, over the auxiliary line pair, the power supply circuit 306 generates 11 volt and 5.5 volt DC output signals. The DC output signals of the power supply circuit 306 are used to supply the power required by the TRC circuit 308, TDLI circuit 310 and relay matrix 302.

The power supply circuit 306 is designed to be extremely energy efficient and to have a very high input impedance below a preselected input level. This high impedance input feature of the power supply circuit 306 is particularly beneficial during conditions when customer termination equipment coupled to the auxiliary line is in use, e.g., during "off-hook" conditions. Because of its high impedance, the power supply circuit 306 does not interfere with normal telephony signaling over the auxiliary line.

Figure 5:
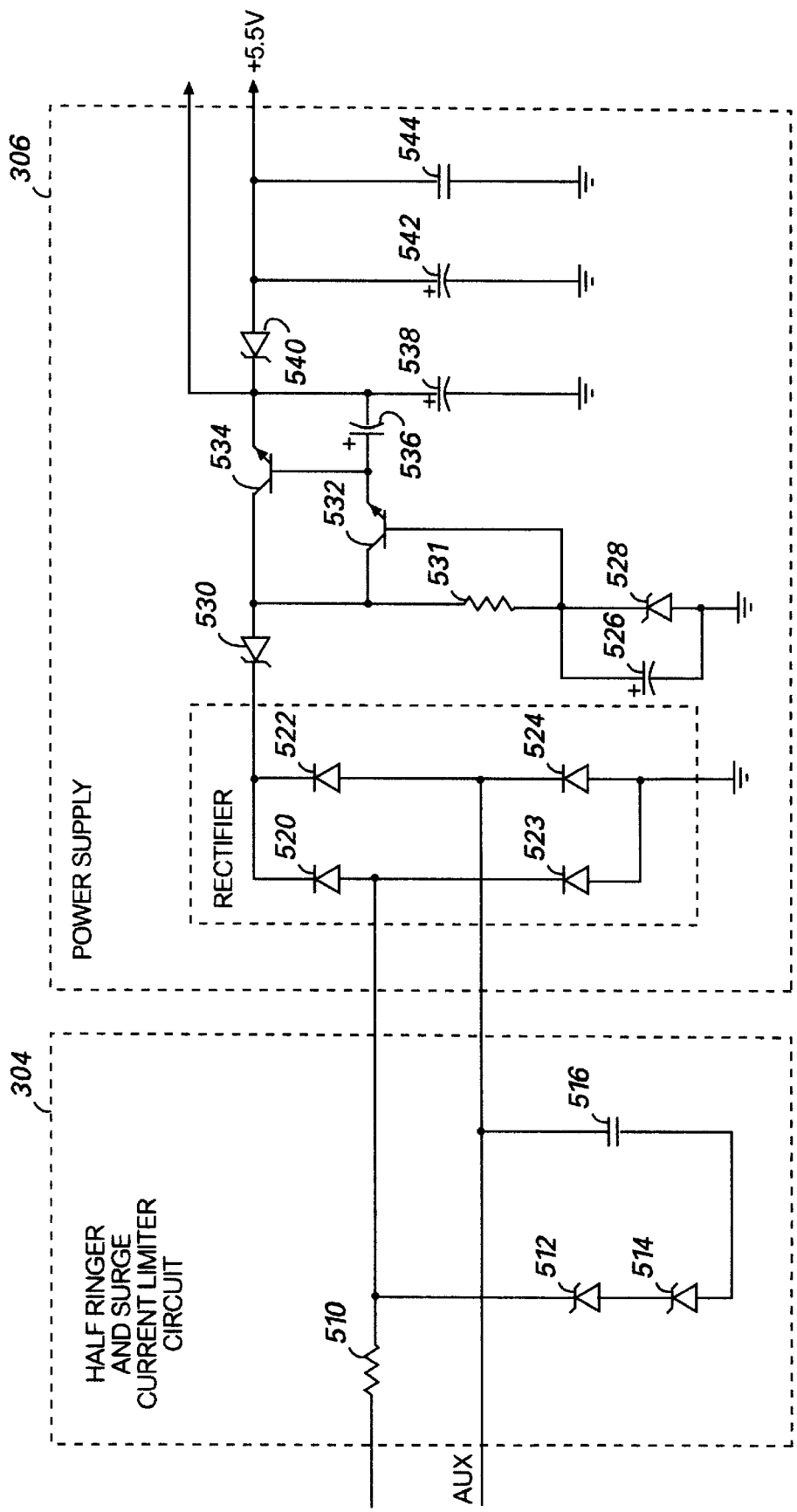
FIG. 5 illustrates the half ringer and surge current limiter circuit and the power supply circuit of FIG. 3 in greater detail.

Referring now to FIG. 5, the half ringer and surge current limiter circuit 304 and power supply circuit 306 of FIG. 3 are illustrated in greater detail.

The half ringer and surge current limiter circuit 304 comprises a resistor 510, first and second zener diodes 512, 514 and a capacitor 516. One side of the resistor 510 is coupled to a first line of the auxiliary input pair while the other side is coupled to the cathode of the first zener diode 512 and to a first line input of the power supply 306. The second line of the auxiliary pair is coupled to the capacitor 516 and to a second line input of the power supply 306. The capacitor 516, in turn, is coupled to the cathode of the second zener diode 514.

The resistor 510 contributes to the impedance of the half ringer circuit 304 while also serving as a current limiter to protect the power supply 306. Capacitor 516 and back to back first and second zener diodes 512, 514 provide a pathway for AC signals which can be used to check that the auxiliary pair is connected to the SNID 300 and is unbroken up to the point at which the half ringer and surge current limiter circuit 304 is located. Capacitor 516 is used to block DC current while back to back zener diodes 512, 514 are used to insure that only signals, e.g., continuity test signals, which exceed the voltage levels usually used for communication on the auxiliary pair will be passed through the return loop formed by the capacitor 516 and zener diodes 512, 514.

The power supply 306 comprises first, second, third and fourth diodes 520, 522, 523, 524 which are arranged to form a bridge rectifier circuit 521. The bridge rectifier circuit 521 has its input terminals coupled to the first and second output lines of the half ringer and surge current limiter circuit 304. The rectifier circuit 521 is used at the input of the power supply 306 to make it insensitive to input polarity reversals and thereby make sure it will operate properly regardless of the bias voltage polarity on the auxiliary line pair.

A first output of the rectifier circuit 521 is coupled to a cathode of a third zener diode 530 while a second output is coupled to ground. The third zener diode 530 is used to give the power supply a high impedance when the input voltage is below a preselected level, e.g., 20 volts. This insures that the power supply will not load the auxiliary line pair when the input voltage is below the preselected level and interfere with "off-hook" communication signals.

The anode of the third zener diode 530 is coupled to the collector of a first transistor 532, the collector of a second transistor 534, and a resistor 531. The resistor 531, in turn, is coupled to a second capacitor 526, a cathode of a fourth zener diode 528, and the base of the first transistor 532. The second capacitor 526 and the anode of the fourth zener diode 528 are coupled to ground. The emitter of the first transistor 532 is coupled to the base of the second transistor 534 and a third capacitor 536. The third capacitor 536 and the emitter of second transistor 534 are, in turn, coupled to a fourth capacitor 538 which is coupled to ground.

The resistor 531, first and second transistors 532, 534, and second, third and fourth capacitors 526, 536, 538 operate to reduce, filter and stabilize the input voltage to produce the 11 volt DC output signal therefrom.

The emitter of the second transistor 534 outputs the 11 volt output signal used to power various other components of the SNID 300.

In addition to being coupled to various components of the SNID 300, the emitter of the second transistor 534 is also coupled to the cathode of a fifth zener diode 540 which is used to step down the 11 volt signal output by the emitter of the second transistor 534 to a 5.5 volt signal. The anode of the fifth zener diode 540 is coupled to fifth and sixth capacitors 542, 544 which provide additional filtering and remove high frequency noise from the 5.5 volt signal. The 5.5 volt signal output of the fifth zener diode 540 serves as the 5.5 volt signal output of the power supply 306. This 5.5 volt DC output signal is used to power various components of the TRC circuit 308, TDLI circuit 310 and relay matrix 302.

A relay matrix 406, implemented in accordance with one embodiment of the present invention, will now be described with reference to FIG. 4. The relay matrix 406 may be used as the relay matrix 303 of FIG. 3.

The relay matrix 406 comprises first through fifth double pole double throw latching relays 410, 412, 414, 416, 418. Each of the first through fifth relays includes a double pole double throw switch 450, 452, 454, 456, 458, a reset coil 440, 442, 444, 446, 448, a set coil 430, 432, 434, 436, 438, and a diode 420, 422, 424, 426, 428, coupled in parallel with the set coil.

A first pair of inputs to each of the respective double pole double throw switches 450, 452, 454, 456, 458 serve as the main line pair inputs to the relay matrix 406. In this manner, line pair one is coupled to the first input of the first switch 450 with each of the successive switches 452, 454, 456, 458 being coupled to another successive one of the main line pair inputs, e.g., line pairs 2 through 5, respectively.

The second pair of inputs to each of the switches 450, 452, 454, 456, 458 are coupled to the auxiliary line pair inputs of the relay matrix 406. In this manner, each switch has a main line pair as its input to its first pair of input terminals and the auxiliary line pair as its input to its second pair of input terminals The output of each switch 450, 452, 454, 456, 458 comprises a single terminal pair which is coupled to, e.g., the end user via one line pair for each of the five main line pairs connected to the relay matrix 406.

The default position for each of the switches 450, 452, 454, 456, 458 is to couple the first pair of input terminals to the output terminals. Accordingly, after resetting to the default position, the main line pairs will be coupled to the outputs of the relays such that the presence of the SNID 300 and relays 450, 452, 454, 456, 458 included therein will generally be transparent to the telephone system.

A reset input of the relay matrix 406 is coupled to a gate input of a transistor 460. The transistor 460 acts as a high impedance switch that controls a current which is sufficient to drive the reset coils 440, 442, 444, 446, 448. The drain of the transistor 460 which generates the amplified reset signal used to control the reset coils is coupled to a resistor 449 and the reset coils 442 and 446 of the second and fourth relays 412, 416 respectively.

In order to reduce the current required to drive the reset coils, reset coil 440 is coupled in series with resistor 449, reset coil 444 is coupled in series with reset coil 442, and reset coil 446 is coupled in series with reset coil 448. Resistor 449 approximates the resistance of a reset relay coil. Resistor 449 serves to insure that approximately the same current flows through reset coil 440 as compared to that which flows through reset coils 442, 444, 446 and 448.

Figure 4:
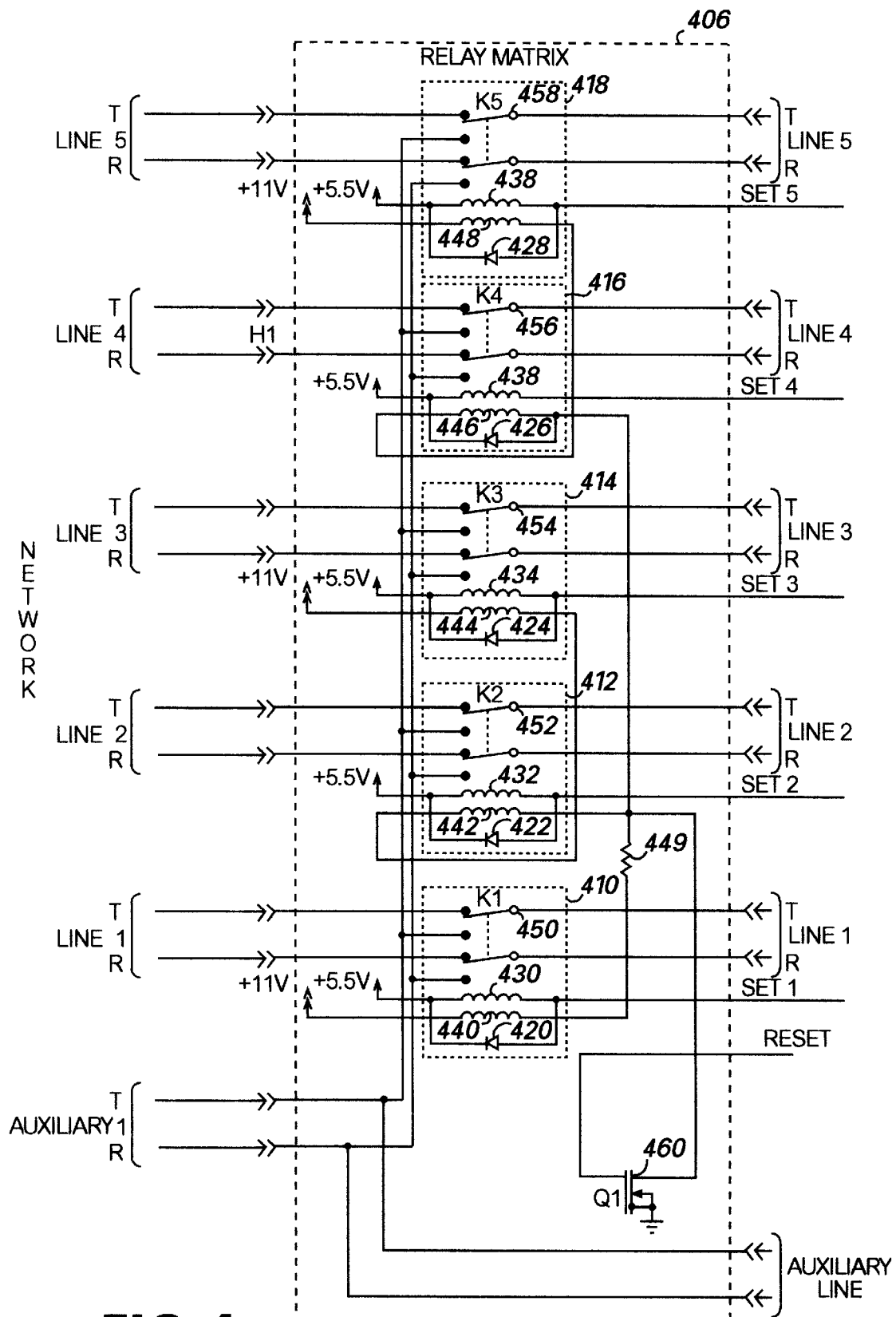
FIG. 4 is a block diagram of a relay matrix according to the present invention suitable for use as the relay matrix of the SNID illustrated in FIG. 3.

By connecting all the reset coils together as illustrated in FIG. 4, it is possible to reset all the relays 450, 452, 454, 456, 458 to the default position by issuing a single reset signal.

As discussed above, in addition to including a reset coil, each of the relay circuits 410, 412, 414, 416, 418 include a set coil 430, 432, 434, 436, 438, respectively. The set coil 430, 432, 434, 436, 438 of each of the first through fifth relay units 410, 412, 414, 416, 418 is coupled to a separate corresponding set signal input of the relay matrix 406. Accordingly, while a single reset signal is used to control the resetting of all the relays 450, 452, 454, 456, 458, an individual set signal is used to control the setting of these relays on an individual basis. The output of each set coil is coupled to a 5.5 volt power supply input of the relay matrix 406 which is powered by, e.g., the power supply unit 306.

The diode 420, 422, 424, 426, 428 placed across each of the set coils 430, 432, 434, 436, 438 has its cathode coupled to the 5.5 volt power supply input of the relay matrix and serves to prevent back EMF signals generated from the relay set coils from damaging the semiconductor switches contained within the TRC circuit 308.

Thus, the setting of each of the first through fifth relays 450, 452, 454, 456, 458 is controlled by individual set signals corresponding to the relay to be set. However, the resetting of all the relays is controlled by a single reset signal. The set and rest signals are generated by a TRC circuit 308.

One particular embodiment of a TRC circuit 308 will now be described with reference to FIG. 6. The TRC circuit 308 of FIG. 6 comprises a microcontroller 610, a clock circuit 611 and a pulse stretcher 616. The microcontroller 610 generates the set and reset signals used to control the relay matrix 306 as a function of a tone detection signal and a TRCC release signal received by the microcontroller 610 from the TDLI circuit 310 embodiment, the microcontroller 610 is a low power RISC-like (reduced instruction set computer) which is the same as, or similar to, microcontroller Part No. PIC16C54, available from Microchip Technology, Inc.

The clock circuit 611 comprises a quartz crystal 616, a first capacitor 612 and a second capacitor 614. A first terminal of the oscillator 616 is coupled to pin 16 of the microcontroller 610 and to a first terminal of the first capacitor 612. A second terminal of the oscillator 611 is coupled to pin 15 of the microcontroller 610 and a first terminal of the second capacitor 614. A second terminal of the first and second capacitors 612, 614 are coupled to ground. The oscillator 611 generates a 32.768 KHz clock signal which is supplied to the clock signal inputs of the microcontroller 610 via pins 15 and 16.

Since the output current available from a single pin of microcontroller 610 is typically insufficient to directly drive a relay coil, each of the SET signals is generated by tying the output of two of the microcontroller's pins together. In this manner, the amount of current that can be used to drive the set coil is effectively doubled as compared to when the outputs are not tied together. For example, the set signal, SET 1, for the first relay unit 410, is provided from the output of microcontroller pins 17 and 18; the set signal, SET 2, for the second relay unit 412, is provided from the output of microcontroller pins 1 and 2; the set signal, SET 3, for the third relay unit 414, is provided from the output of microcontroller pins 8 and 9; the set signal, SET 4, for the fourth relay 416, is provided from the output of microcontroller pins 10 and 11; and the set signal, SET 5, for the fifth relay unit 418, is provided from pins 12 and 13.

Since the relay reset signal generated by the TRC circuit 308 is switched within the relay matrix 406, the output of a single microcontroller pin, e.g., pin 7, can provide a sufficiently powerful reset control signal.

Figure 6:
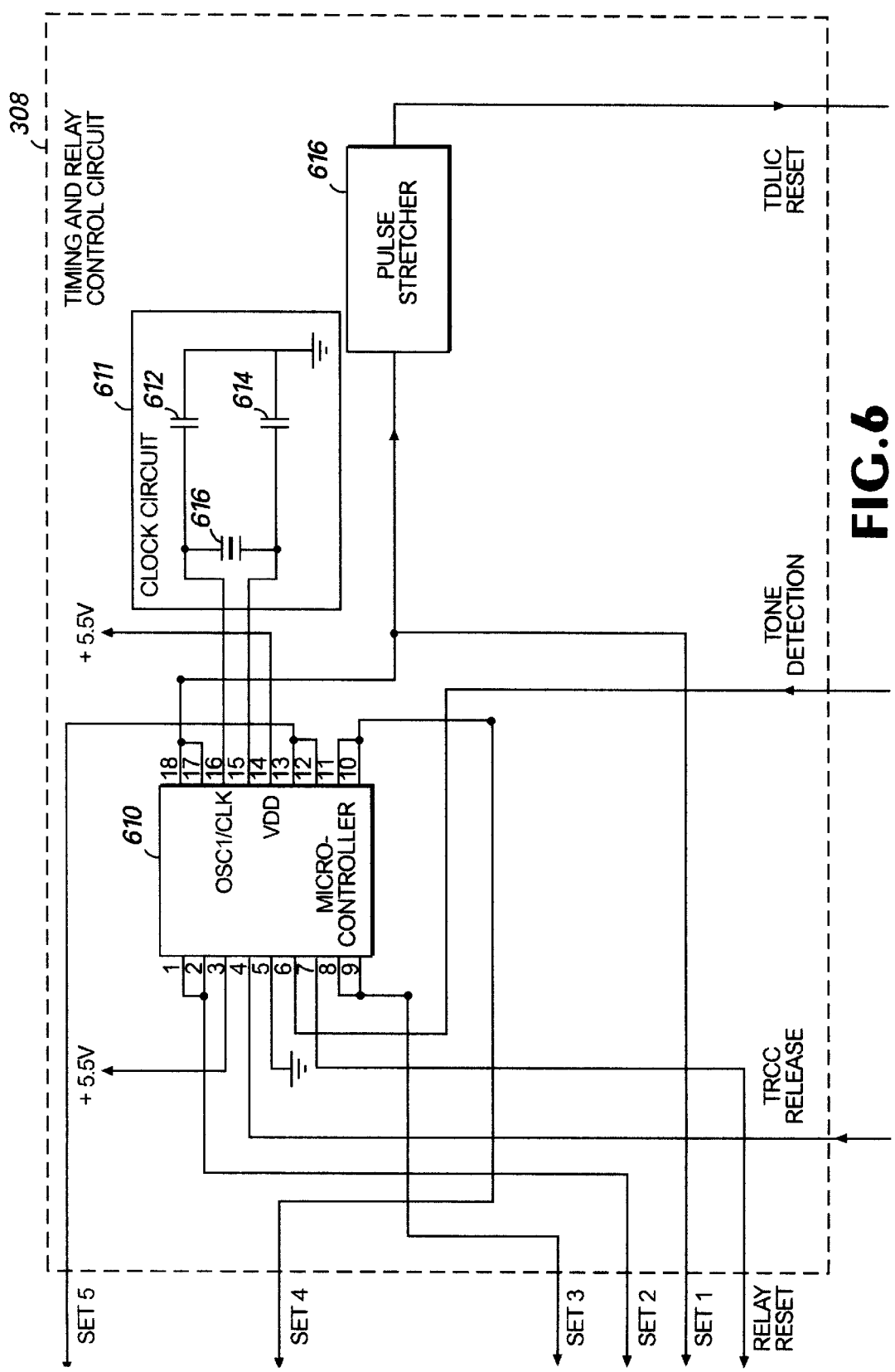
FIG. 6 illustrates the timing and relay control circuit of FIG. 3 in greater detail.

In the embodiment of FIG. 6, because of the limited number of available microcontroller pins, the output of pins 17 and 18 is used as a TDLIC reset signal as well as a relay set signal. As illustrated the pulse stretcher 616 is coupled to the output of microcontroller pins 17 and 18. This circuit stretches, i.e., increases the duration of signals output at microcontroller pins 17 and 18. In this embodiment, pulses that are of an insufficient duration to cause a relay to reset are output by the microcontroller 610 on pins 17 and 18 as short TDLIC signals. These relatively brief TDLIC signals are then stretched in duration by the pulse stretcher 616 to create the TDLIC reset signal that is output by the TRC circuit 308 and supplied to the TDLI circuit 310. In this manner, microcontroller pins 17 and 18 can be used to supply a relay coil set signal as well as the TDLIC reset signal.

Thus, the TRC circuit 308 generates relay set and reset signals as well as the TDLIC reset signal. The various signals generated by the TRC circuit 308 are generated as a function of a TRCC release signal supplied to microcontroller pin 4 and a tone detection signal supplied to microcontroller pin 6. The TRCC release signal and tone detection signal are generated by the TDLI circuit 310 which will now be described in detail with reference to FIGS. 7 and 8.

Figure 7:
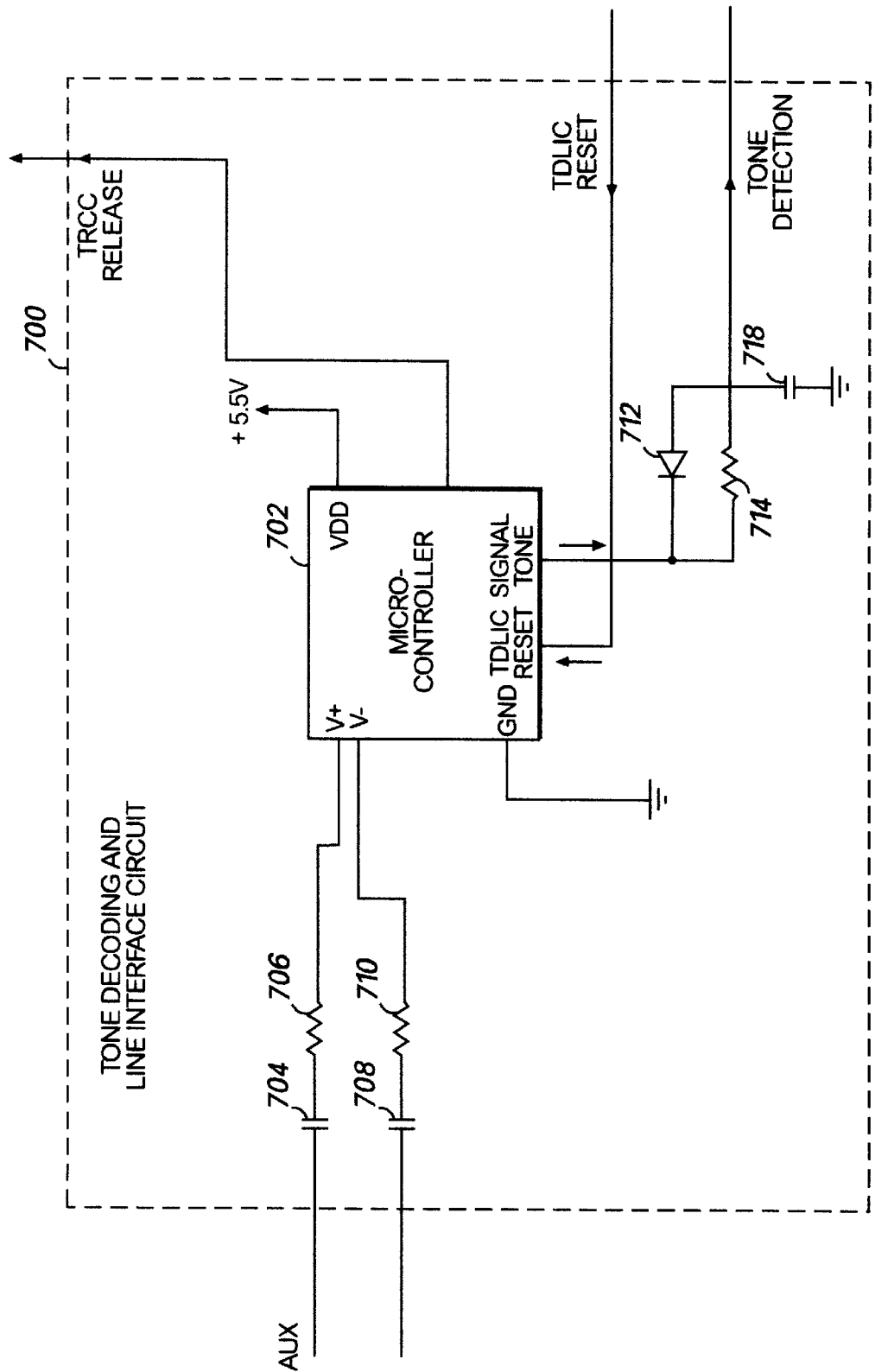
FIG. 7 is a block diagram of a tone decoding and line interface circuit suitable for use in the SNID illustrated in FIG. 3.

FIG. 7 illustrates a TDLI circuit 700 suitable for use as the TDLIC circuit 310 of FIG. 3. The TDLI circuit 700 comprises a microcontroller 702, first and second capacitors 704, 708, first, second, and third resistors 706, 710, 714, diode 712 and capacitor 718.

The microcontroller 702 has a first input coupled via the first capacitor 704 and the first resistor 706 to the first line of the auxiliary line pair. A second input of the microcontroller 702 is coupled to the second line of the auxiliary line pair via the second capacitor 708 and the second resistor 710. By using capacitance coupling at the input of the TDLI circuit 700, DC loading of the auxiliary line pair is avoided.

The microcontroller 702 is powered by a 5.5 volt signal which is supplied to the VDD input of the microcontroller 702. As will be discussed further below, with reference to the flow chart of FIG. 9, the microcontroller 702 is responsible for generating a TRCC release signal and a command tone output signal. The TRCC release signal is used to enable and reset the TRCC circuit 308 when certain preselected command signal input conditions are satisfied, e.g., when a tone of a preselected frequency is detected at the auxiliary line pair inputs to the microcontroller 702 for a preselected period of time, e.g., 4 seconds. The microcontroller 702 is responsive to the TDLIC reset signal to reset timing circuitry included within the microcontroller 702. The timing circuitry is used to control the generation of the TRCC release signal.

The microcontroller's command tone output is a signal that is generated by the microcontroller 702 from the auxiliary line pair input. Its value is a function of the presence of a tone of a preselected frequency, e.g., 2713 Hz, which is used to transmit commands to the TDLI circuit 700 being present at the microcontroller auxiliary pair input.

The command tone output by the microcontroller 702 is integrated by the integrator circuit formed by the diode 712, third resistor 714 and capacitor 718. The integrated command tone forms the tone detection signal which is output by the TDLI circuit 700 and is supplied to, e.g., the TRC circuit 308. The tone detection signal will be high when an input signal on the auxiliary pair line having a frequency corresponding to the preselected command tone frequency is received.

Figure 8:
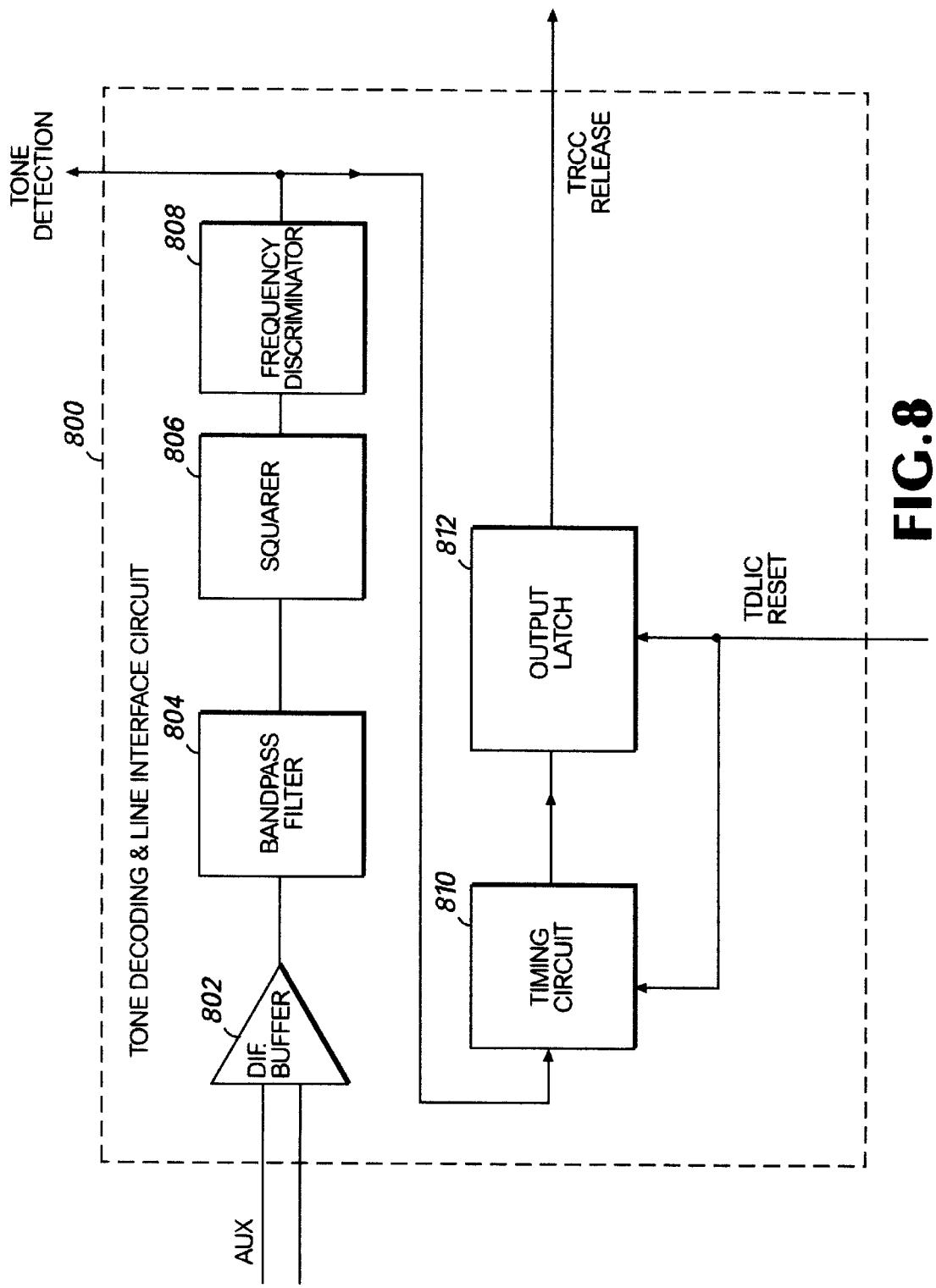
FIG. 8 is another block diagram of a tone decoding and line interface circuit suitable for use in the SNID of FIG. 3.

Referring now to FIG. 8, there is another block diagram illustrating a TDLI circuit 800 which may be used as the TDLI circuit 310 of FIG. 3. While the block diagram of FIG. 8 may be somewhat different than that of FIG. 7, the circuits of FIGS. 7 and 8 operate in a similar manner.

As illustrated the TDLI circuit of FIG. 8, comprises a differential buffer 802, a bandpass filter 804, a squarer 806, a frequency discriminator 808, a timing circuit 810 and an output latch 812 which are coupled to each other as shown in FIG. 8.

The differential buffer 802 is coupled to the auxiliary pair input of the TDLI circuit 800 and is used to provide the TDLI circuit 800 with a high input impedance to avoid loading of the auxiliary line pair. The output of the differential buffer 802 is coupled to a bandpass filter 804. The bandpass filter 804 filters the signal received from the differential buffer 802 to remove noise. The bandpass filter 804 passes a band of frequencies which include the frequency used to control the switching of the relay matrix. The output of the bandpass filter 804 is coupled to the input of the squarer 806 which performs a pulse shaping operation on the received signal. The squared signal output by the squarer 806 is supplied to the digital frequency discriminator 808. The frequency discriminator 808 is used to detect the presence of the command signals by their tone. When a tone having a frequency corresponding to the preselected frequency used for switch control commands is received, the output of the frequency discriminator goes high. The frequency discriminator output serves as the tone detection signal output of the TDLI circuit 800 and as the input to the timing circuit 810. The timing circuit 810 monitors the frequency discriminator output signal to determine the length of each command tone. The timing circuit generates a high output signal when an uninterrupted command tone is received for a preselected minimum period of time, e.g., 4 seconds. The timing circuit output signal is used to set the output latch 812 which generates the TRCC release signal used to enable the TRC circuit. A TDLIC reset signal is supplied to a reset input of the output latch 812 and timing circuit 810 to reset the timing circuit and latch after the end of a command cycle.

Figure 9:
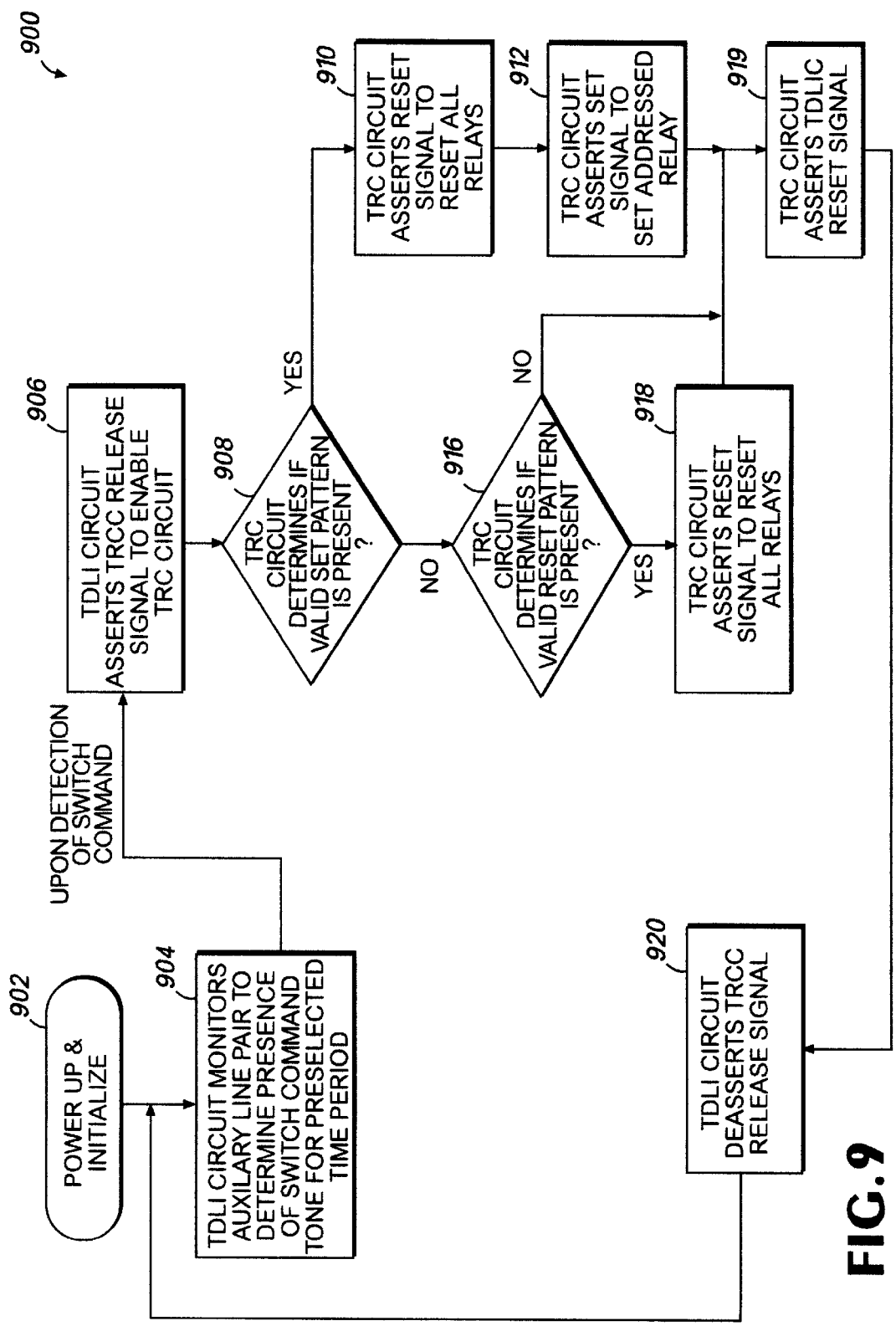
FIG. 9 is a flow chart that illustrates the steps performed by the SNID of FIG. 3 in accordance with one embodiment of the present invention.
Figure 10:
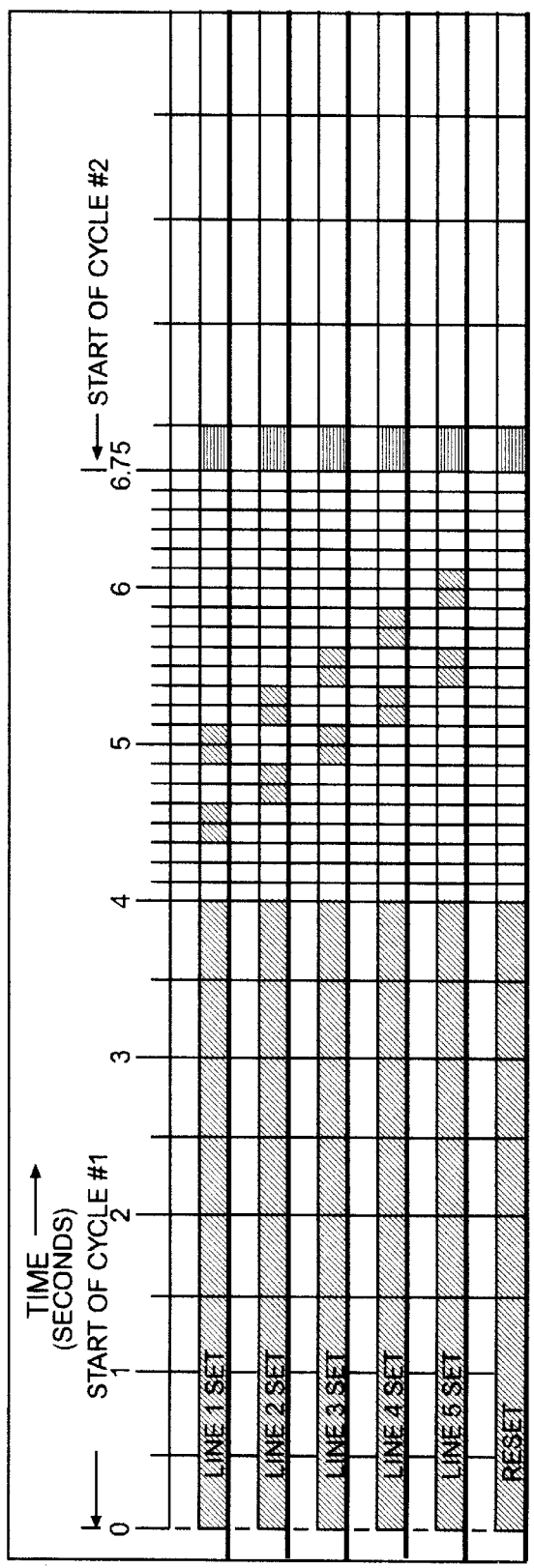
FIG. 10 is an exemplary timing diagram illustrating the timing associated with command signals used to set and reset the relays of the relay matrix illustrated in FIG. 4 in accordance with one embodiment of the present invention.

Referring now to FIGS. 9 and 10, the overall operation of the SNID 300 will be explained. As illustrated, in the flow chart 900 of FIG. 9, operation of the SNID 300 begins with a power up and initialization operation represented by step 902. As a result of the initialization process, the TRC reset signal will be low disabling the TRC circuit 308 to prevent accidental switching of the relays and the TDLI circuit 310 will be active.

After initialization and power up the SNID 300 progresses to step 904. In step 904 the TDLI circuit 310 monitors the auxiliary line pair to determine the presence of a switch command tone for a preselected uninterrupted period of time, e.g., 4 seconds.

Referring now to FIG. 10, there is illustrated a timing diagram showing signals which may serve as the SET and RESET command signals used to control the switching of the relay matrix 302. In FIG. 10, shaded areas are used to indicate the assertion of a command tone on the auxiliary line pair. As illustrated in FIG. 10, each of the SET and RESET commands begins with an uninterrupted 4s period in which the command tone is asserted. This portion of each command signal is used to activate the TRC circuit 308.

Referring once again to FIG. 9, when the TDLI circuit 310 determines that it has received a command tone for the preselected period of time, e.g., 4 seconds into the command cycle, it asserts the TRCC release signal thereby enabling the TRC circuit 308. Assertion of the TRCC release signal is represented by step 906.

Operation of the SNID 300 then progresses from step 906 to step 908 which is a decision step. In step 908, the TRC circuit determines if a valid set pattern has been received by monitoring the tone detection signal and comparing it to possible set and reset commands, e.g., the command signals illustrated in the timing diagram of FIG. 10. To determine the presence of a particular set or reset command, in the embodiment which uses the command signals of FIG. 10, the location or absence of two pulses within the four to 6.75 second time frame, as measured from the start of the command cycle, is used to determine which particular set or reset command is received. For the TRC circuit to consider a command to be valid, it must be followed by the start of a second command cycle as indicated by the receipt of the command tone for a second preselected period of time, e.g., 250 ms, which is equal to or less than, the first preselected period of time, e.g., 4 seconds. By monitoring for the start of a second command cycle the TRC circuit can increase the certainty that a command was properly received since anything other than two pulses or no pulses in the 4 to 6.75 ms time period and a silence preceding the start of a new command cycle would serve as an indication of an invalid or erroneous command signal condition. Such relatively long signal time periods and timing requirements simplify signal detection requirements and reduce the risk that the relays will be switched erroneously, thereby potentially interrupting communications.

Referring once again to FIG. 9, if the TRC circuit 308 determines that a valid set pattern is present in step 908, operation progresses to step 910. In step 910 the TRC circuit asserts a reset signal to reset all relays to the default feed through position. Following this step, in step 912, the TRC circuit 308 asserts the SET command corresponding to the relay addressed by the detected set command. This results in the addressed relay being switched so that the output of the relay is coupled to the auxiliary line pair as opposed to the main pair to which the relay circuit is also coupled. Operation then proceeds to step 919.

If, in step 908 a valid set pattern is not detected, operation progress to step 916. In step 916, the TRC circuit determines if a valid reset pattern was received by monitoring the tone detection signal. If a valid reset pattern has been received operation progresses to step 918 and the TRC circuit asserts the RESET signal to reset the relays of the relay matrix 302 to the default position. After the RESET signal is asserted, operation progresses to step 919.

In the event that a valid reset signal is not detected by the TRC circuit 308 in step 916, operation progresses directly to step 919 bypassing step 918.

In step 919 the TRC circuit asserts the TDLIC reset signal. This reset operation occurs sufficiently into the start of the second command cycle such that the TDLI circuit will be reset at a point were it will prevent it from responding to the presence of the second command signal in the second command cycle. In this manner, the central office can set a relay by sending a command twice without concern of immediately resetting the relay after a first set command is performed.

In step 920, the TDLI circuit 310 deasserts the TRCC release signal, thereby disabling the TDLI circuit 310 and operation progresses to step 904 where the TDLI circuit again monitors the auxiliary line pair for a switch command.

It should be noted that the references to line pair inputs and outputs above is for purposes of convenience and that the line pairs referred to above may be either bi-directional or uni-directional communication paths.

What is claimed is:

1. A method for controlling a switching device in a POTS communication system including twisted pair copper lines, the device having a plurality of main signal line inputs connected to respective main POTS telephone lines, an auxiliary line input connected to a POTS auxiliary telephone line, and a plurality of signal line outputs, to disconnect one of the main signal line inputs from a signal line output and connect the auxiliary line input to the signal line output, comprising the steps of:

powering said device from power provided by the POTS system on said auxiliary signal line;

receiving a tone transmitted from a remote location to the device on said auxiliary line;

detecting the tone as a function of the duration of the tone; and upon the detection of said tone, disconnecting a predetermined one of the main signal line inputs from a predetermined one of the signal line outputs and connecting the auxiliary signal line input to the predetermined signal line output.

2. The method of claim 1 wherein said tone has a duration of at least 0.1 second.

3. The method of claim 1 wherein said tone has a duration of at least 1 second.

4. The method of claim 1 wherein the tone has a duration of at least 4 seconds.

5. The method of claim 1 wherein the step of powering includes the step of providing a power supply circuit that has a high input impedance below 20 volts.

6. The method of claim 1 wherein the tone has a frequency of less than 5 kHz.

7. The method of claim 1 wherein the tone has a frequency of less than 3 kHz.

8. A switching device, for use in a POTS communication system including twisted pair copper lines, the device having inputs connected to respective main signal lines and an auxiliary signal line, comprising:

a matrix of latching relays, each latching relay having a first signal input, a second signal input, and an output connected to an end user's line, each one of the first signal inputs being coupled to a different one of the main signal lines, the second signal input of each one of the latching relays begin coupled to the auxiliary signal line, each one latching relays coupling one of the first and second signal inputs to the output; and a power supply coupled to the auxiliary signal line and to the latching relays, the power supply having a high input impedance when the input signal is below twenty volts; and circuitry coupled to said auxiliary signal line for detecting a tone transmitted from a remote location on said auxiliary signal line and coupled to the plurality of latching relays, wherein in response to detection of the tone, the circuitry generates a set signal to cause a particular one of the latching relays to couple the second signal input to the output of the particular one of the latching relays.

9. The switching device of claim 8 wherein said circuitry comprises a tone decoding and line interface circuit coupled to the auxiliary signal line for detecting the presence of the tone as a function of the uninterrupted duration of at least a portion of the tone.

10. The switching device of claim 9 wherein said circuitry further comprises a timing and relay control circuit coupled to the tone decoding and line interface circuit for generating the set signal and a reset signal used to control the plurality of latching relays.

11. The switching device of claim 8 wherein said power supply, matrix, and circuitry is housed in a sealed, weather-resistant housing.

12. The switching device of claim 8 wherein the tone has a frequency of less than 3 kHz.

13. The switching device of claim 8 wherein the tone has a duration of at least 4 seconds.

14. The switching device of claim 8 wherein the latching relays require power only when a switching operation is performed.

15. The switching device of claim 10 wherein said timing and relay control circuit generates an individual relay set signal to cause a single predetermined relay to disconnect a predetermined main line and connect the auxiliary line.

16. The switching device of claim 10 wherein all relays can be reset to connect the main lines to the output lines with a single reset command generated by the timing and relay control circuit.

17. The switching device of claim 8 wherein said tone is generated by a standard POTS tone generator.

* * * * *